Oct. 5, 1971   R. P. SLICKER   3,609,809
EXTRUSION DIE

Filed Nov. 6, 1968   2 Sheets-Sheet 2

INVENTOR.
R. P. SLICKER
BY Young + Quigg
ATTORNEYS

United States Patent Office 3,609,809
Patented Oct. 5, 1971

3,609,809
EXTRUSION DIE
Robert P. Slicker, Bartlesville, Okla., assignor to
Phillips Petroleum Company
Filed Nov. 6, 1968, Ser. No. 773,776
Int. Cl. B29d 23/04
U.S. Cl. 18—14 R                           3 Claims

ABSTRACT OF THE DISCLOSURE

A die for the extrusion of hollow tubing comprises a housing with a longitudinal interior opening which diverges outwardly from the inlet and converges to the die outlet. A hollow torpedo is supported by a spider in the inlet section of the housing to define an annular passage; and a hollow core, also supported by the spider, is positioned in the outlet section of the housing to define an annular passage. Heat is supplied to the housing by a plurality of heating elements. A cooling medium is passed through the interior of the torpedo and the core to permit accurate control of temperature of the material being extruded.

---

It is common practice to form tubing and parisons by extruding molten thermoplastic materials through a die having an annular passage. When heat sensitive thermoplastic materials are employed, it is quite important to control the temperature of the die in order to prevent degradation of the thermoplastic material and to form extruded articles of uniform density with smooth surfaces. Temperature control is particularly important when relatively large objects having thick walls are to be formed.

In accordance with the present invention, an improved extrusion die is provided which permits accurate temperature control to be maintained. This die is formed by a housing having an elongated opening which extends from an inlet to an outlet nozzle. The inlet is adapted to be connected to an extruder to receive thermoplastic material in a molten state. A hollow member is positioned centrally within the housing to establish an annular passage through which the molten material is extruded. This annular passage diverges outwardly from the inlet of the housing, and then converges to the die nozzle. Heating elements are mounted on the die housing to maintain the housing at selected temperatures. A coolant is circulated through the hollow member to permit the interior temperature to be regulated. In this manner, a desired temperature gradient can be maintained across the annular passage to permit accurate control to be maintained of the material being extruded.

Accordingly, it is the object of this invention to provide an improved extrusion die in which accurate temperature control can be maintained.

Figure 1:
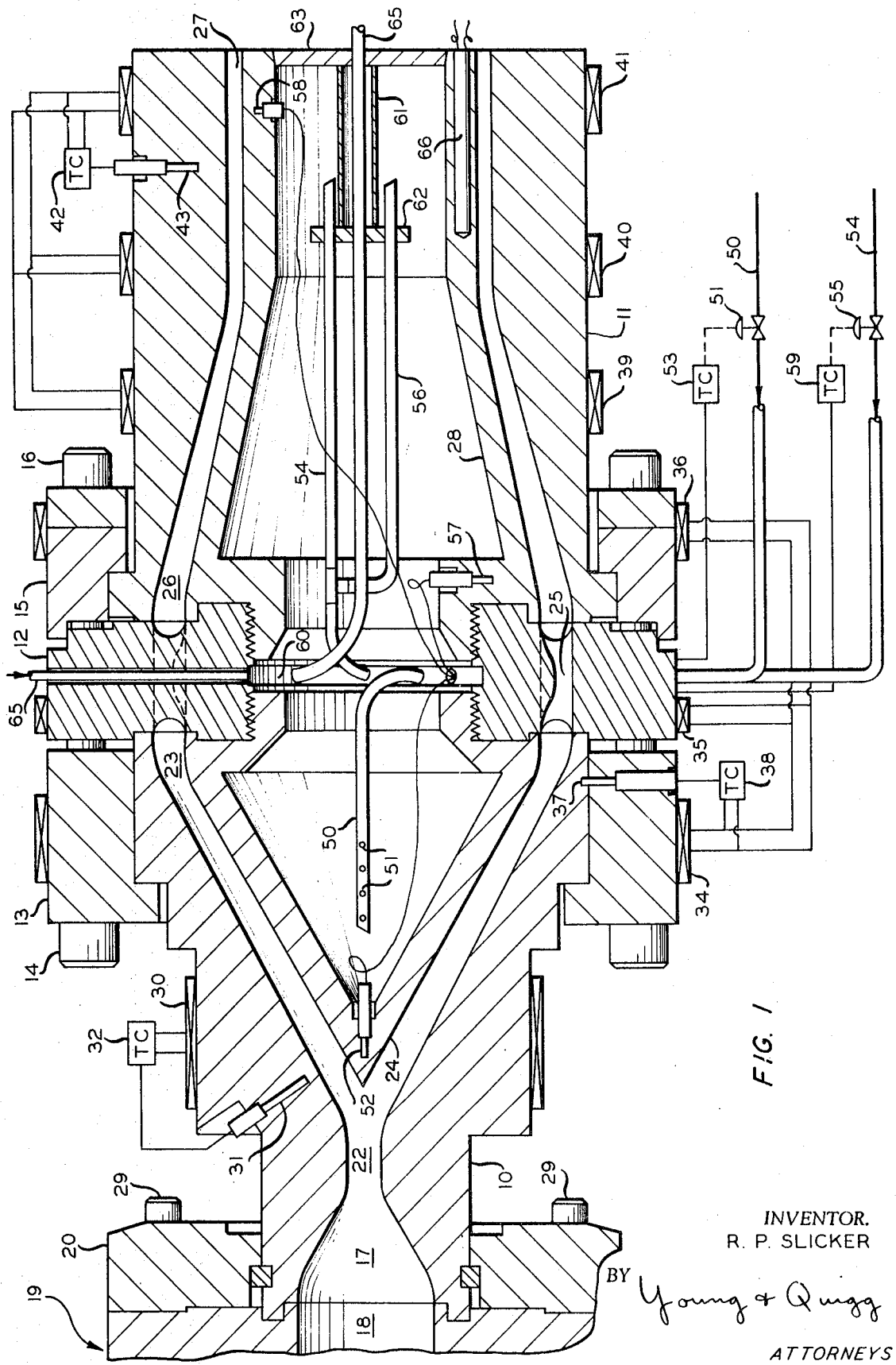
Figure 3:
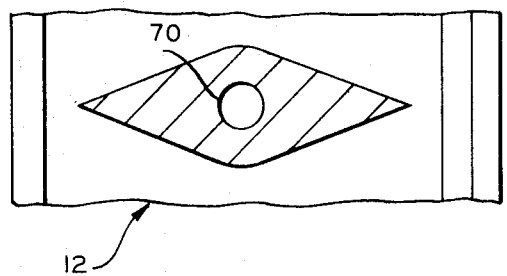
Figure 2:
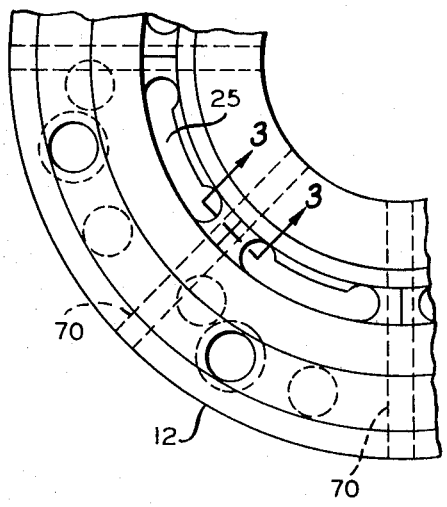

In the drawing:
FIG. 1 is a view, shown partially in section, of an embodiment of the extrusion die of this invention.
FIG. 2 illustrates a portion of the spider which supports the interior members of the die of FIG. 1.
FIG. 3 is a view taken along line 3—3 in FIG. 2.

Referring now to the drawing in detail, the extrusion die comprises a housing which is formed by an inlet member 10 and a die ring 11. A spider 12 is positioned between these two elements. Inlet member 10 is secured to spider 12 by the first clamping ring 13 which is held in position by a plurality of screws 14. Die ring 11 is secured to spider 12 by a clamping ring 15 which is held in position by a plurality of screws 16. Member 10 is provided with an inlet opening 17 which is aligned with the outlet opening 18 of a conventional screw extruder 19, which advantageously can be a single screw extruder. A ring 20 is secured to the inlet end of member 10 by a split ring key 21 and is connected to the nozzle of extruder 19 by screws 29 or other suitable attaching means. Extruder 19 recives thermoplastic material at its inlet and delivers this material in a molten state to inlet opening 17 of the extrusion die of this invention.

The opening through member 10 converges to a central passage 22 and then diverges to an annular passage 23. A hollow torpedo 24 is threaded to spider 12 so as to be positioned centrally within annular passage 23. Spider 12 is provided with a plurality of openings 25 to permit passage of the molten thermoplastic material into die ring 11. The inlet passage 26 of die ring 11 is aligned with openings 25 and converges to an outlet passage 27 which is of a diameter that corresponds to the diameter of the object to be formed. A hollow core 28 is threaded to spider 12 so as to be positioned centrally within passages 26 and 27. The thermoplastic material extruded through passage 27 can be cooled by conventional cooling means, not shown, beyond the die to solidify the material and form a solid hollow tubing. Alternatively, the material extruded through passage 27 can be a parison which is passed to conventional blow molding apparatus.

An important feature of this invention resides in providing temperature control means to maintain a predetermined temperature gradient along the extrusion die. A first external heating element 30 is mounted on inlet member 10. A temperature sensing element 31, such as a thermocouple or thermistor, is positioned within member 10 to sense the temperature adjacent annular passage 23. Element 31 is connected to a conventional temperature controller 32 which regulates the amount of heat supplied by heating element 30 to maintain a constant temperature at the region of sensing element 31. If an electrical resistance heating element is employed as element 30, temperature controller 32 can be employed to control the amount of current supplied to the resistance element. A plurality of heating elements 34, 35 and 36 are positioned at the central region of the extrusion die as illustrated. A temperature sensing element 37 is positioned in this area to regulate the heat supplied by elements 34, 35 and 36 through a temperature controller 38. A plurality of heating elements 39, 40 and 41 are mounted on die ring 11. The heat supplied by these elements is regulated by a temperature controller 42 in response to a temperature sensing element 43.

The heating elements thus far described can be employed to maintain any desired temperature gradient along the extrusion die. When the die is employed to extrude relatively thick-walled pipe of poly(vinylchloride), it is often desirable to provide an increased temperature gradient along the die. Particularly good results have been obtained in such an operation by maintaining the temperatures in the regions of temperature sensing elements 31, 37 and 43 at approximately 330° F., 340° F. and 375° F., respectively. The particular temperature gradient to be maintained is, of course, a function of the particular thermoplastic material being extruded and thickness of the extrudate. The most advantageous temperatures to be employed are generally arrived at by a trial and error procedure to determine the best operating conditions. These conditions can then be maintained by adjusting the set points of the individual temperature controllers.

Another important feature of this invention resides in providing a means for cooling the interior of torpedo 24 and the interior of core 28. A first conduit 50, which has a control valve 51 therein, extends through a radial opening in spider 12 to a region within torpedo 24. The interior end of conduit 50 is open, and a plurality of holes 51 are formed in the conduit to distribute the coolant inside the torpedo. A temperature sensing element 52 is mounted in the end of torpedo 24 to sense the temperature at this region. Element 52 can be connected to a temperature controller 53, the output of which regulates the opening of valve 51. In this manner, the flow of coolant, which can be air or other fluid medium, can be regulated to control the cooling of torpedo 24 so as to maintain a predetermined temperature in the region of element 52. In similar fashion, the temperature within core 28 can be controlled by the introduction of coolant through a conduit 54 which has a control valve 55 therein. A conduit 56 is connected to conduit 54 within core 28 to provide a second cooling fluid distribution tube. Temperature sensing elements 57 and 58 are positioned within core 28 to detect temperatures at the regions illustrated. Either or both of these sensing elements can be connected to a temperature controller 59 to regulate the opening of valve 55. If both temperature sensing elements are employed, the average measured temperature can be employed to control valve 55. In some operations, automatic control of the coolant flow is not needed. Under these circumstances, sensing elements 57 and 58 can be connected to recording instruments.

A central support member 60 is carried by spider 12 to position conduits 50 and 54 within torpedo 24 and core 28. A hollow tube 61, which carries a support plate 62, is secured to a plate 63 which extends across the outlet end of core 28. These elements serve to support the interior ends of conduits 54 and 56. A third conduit 65 extends through a radial opening in spider 12 to the interior of core 28 and through plates 62 and 63 to a region downstream of the extrusion die. When the die is employed to extrude pipe, air under pressure is passed through conduit 65 at the start of the operation to provide sufficient pressure in the downstream cooling means to maintain the pipe in an expanded condition during startup. A plurality of spaced heating elements 66 are inserted in the downstream end of core 28 to provide additional internal heating during startup. These heating elements are normally disconnected prior to startup.

As illustrated in FIGS. 2 and 3, spider 12 is provided with a plurality of radial passages 70 for passage of the various conduits and the connecting wires to the temperature sensing elements. One or more of these passages can be used to vent coolant from the interior of torpedo 24 and core 28. As illustrated in FIG. 3, the cross section of spider 12 between passages 25 is generally diamond shaped. It has been found that this configuration is particularly effective in extruding thick-walled pipes in that it tends to minimize hangup of material within the die.

The external heaters and the circulation of cooling fluid through the interior of the die permit accurate temperature control to be maintained within the annular passage. By proper control of the application of heat and coolant, degradation of the plastic material being extruded is prevented and articles having a uniform density and smooth walls are obtained.

While this invention has been described in conjunction with a presently preferred embodiment, it obviously is not limited thereto.

What is claimed is:

1. An extrusion die comprising:
  a housing having an inlet and an outlet and an elongated opening extending from said inlet to said outlet, said opening converging laterally inwardly from said inlet to a first region spaced therefrom, then diverging laterally outwardly from said first region to a central region, and finally converging laterally inwardly toward the region of the outlet;
  a spider positioned in said central region of said opening;
  a hollow torpedo secured to said spider and extending therefrom through said opening toward said inlet, said torpedo being spaced from the interior wall of said housing to form an annular diverging passage in said housing;
  a hollow core secured to said spider and extending therefrom through said opening toward said outlet, said core being spaced from the interior wall of said housing to form an annular converging passage in said housing; and
  heating apparatus in engagement with said housing to permit the temperature thereof to be elevated, said heating apparatus comprising first heating means secured to the exterior of said housing between said inlet and said spider, second heating means secured to the exterior of said housing in the region of said spider, and third heating means connected to said housing between said spider and said outlet, said three heating means being separate to permit a temperature gradient to be established along said housing, means to circulate a coolant through the interior of said torpedo comprising a first conduit extending through said spider from a region exterior of said housing to the interior of said torpedo; and means to circulate a coolant through the interior of said core comprising a second conduit extending through said spider from a region exterior of said housing to the interior of said core, said spider being provided with an opening to permit coolant to be exhausted to the exterior of said housing.

2. The extrusion die of claim 1 wherein said heating apparatus includes a first temperature sensing element positioned to sense the temperature within said housing adjacent said first heating means, means responsive to said first temperature sensing means to control said first heating means, second temperature sensing means positioned to measure the temperature within said housing adjacent said spider, means responsive to said second temperature sensing means to control said second heating means, third temperature sensing means positioned to sense the temperature within said housing adjacent said third heating means, means responsive to said third temperature sensing means to control said third heating means, fourth temperature sensing means positioned to sense the temperature within said torpedo adjacent said first region, means responsive to said fourth temperature sensing means to control the flow of coolant through said first conduit, fifth temperature sensing means positioned to measure the temperature within said core, and means responsive to said fifth temperature sensing means to control the flow of coolant through said second conduit.

3. The extrusion die of claim 1, further comprising a tube extending from a region exterior of said housing through said spider and through said core to a region exterior of said housing at a point adjacent said outlet to supply pneumatic pressure to the interior of a tube extruded through said die.

References Cited

UNITED STATES PATENTS

| 2,057,467 | 10/1936 | Williams. |
| 2,367,144 | 1/1945 | Shaver. |
| 2,461,630 | 2/1949 | Cozzo. |
| 2,688,770 | 9/1954 | Henning. |
| 2,760,046 | 8/1956 | Rothacker. |
| 2,808,623 | 10/1957 | Foster. |
| 3,111,714 | 11/1963 | Branscum. |

ANDREW R. JUHASZ, Primary Examiner

L. GILDEN, Assistant Examiner

U.S. Cl. X.R.

18—30 JT